United States Patent
Wu et al.

(10) Patent No.: US 7,670,252 B2
(45) Date of Patent: Mar. 2, 2010

(54) METHOD AND APPARATUS FOR CONTROLLING AN ELECTRO-MECHANICAL TRANSMISSION DURING A SHIFT EXECUTION

(75) Inventors: Peter E. Wu, Brighton, MI (US); Thyagarajan Sadasiwan, Ypsilanti, MI (US); Anthony H. Heap, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 558 days.

(21) Appl. No.: 11/561,048

(22) Filed: Nov. 17, 2006

(65) Prior Publication Data
US 2008/0119320 A1 May 22, 2008

(51) Int. Cl.
*B60K 1/02* (2006.01)
(52) U.S. Cl. .......................................... 477/3; 477/107
(58) Field of Classification Search ............... 477/2, 477/3, 107
See application file for complete search history.

(56) References Cited

U.S. PATENT DOCUMENTS

| | | | | |
|---|---|---|---|---|
| 5,046,383 | A * | 9/1991 | Butts et al. | 477/120 |
| 5,282,401 | A * | 2/1994 | Hebbale et al. | 475/123 |
| 6,319,170 | B1 * | 11/2001 | Hubbard et al. | 477/107 |
| 7,223,201 | B2 * | 5/2007 | Colvin et al. | 477/5 |
| 7,503,875 | B2 * | 3/2009 | Fujii et al. | 477/107 |

* cited by examiner

Primary Examiner—Ha D. Ho

(57) ABSTRACT

A method and apparatus to control an electro-mechanical transmission during a shift event, including identifying a fault in an off-going clutch, is provided. The method includes deactivating an off-going torque-transfer clutch, monitoring slippage of the off-going torque-transfer clutch, and limiting a change in operation of an electrical machine operatively connected to the transmission until the slippage of the off-going torque-transfer clutch exceeds a threshold. Limiting a change in operation of the electrical machine comprises limiting an output torque of the electrical machine, comprising limiting a time-rate change in the output torque and limiting a magnitude of the output torque. The limit of the change is discontinued when the slippage of the off-going torque-transfer clutch exceeds the threshold.

20 Claims, 4 Drawing Sheets

METHOD AND APPARATUS FOR CONTROLLING AN ELECTRO-MECHANICAL TRANSMISSION DURING A SHIFT EXECUTION

TECHNICAL FIELD

This invention pertains generally to powertrain control systems for fuel/electric hybrid powertrain systems, and more specifically to powertrain control during transmission shifts.

BACKGROUND OF THE INVENTION

Fuel/electric hybrid powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from an internal combustion engine, and an output member for delivering motive torque from the transmission to the vehicle driveline. Exemplary electro-mechanical transmissions are selectively operative in fixed gear modes and continuously variable modes through actuation of torque-transfer clutches. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit, including electrically-actuated hydraulic flow management valves, pressure control solenoids, and pressure monitoring devices controlled by a control module.

Engineers implementing powertrain systems having electro-mechanical transmissions are tasked with developing shifting schemes between various operating modes, including the fixed gear modes and the continuously variable modes. Execution of a shift typically includes deactivating an off-going clutch, and continuing operation or actuating an oncoming clutch. A control system is typically programmed to execute tasks during a transmission shift to effect a smooth shift transition substantially imperceptible to the vehicle operator. Such control tasks include synchronizing clutch speed of the oncoming clutch by controlling operating parameters of the engine and electrical machines. Operating parameters include torque outputs and operating speeds of the engine and electrical machines. However, if a fault were to unknowingly occur in deactivating the off-going clutch, the control system may act to control the operating parameters of the engine and electrical machines to effect the shift transition even though the off-going clutch has not deactivated, potentially resulting in operator dissatisfaction.

Therefore, there is a need to for a method and apparatus to control operation of a hybrid transmission during gear shifting events, to address concerns mentioned hereinabove.

SUMMARY OF THE INVENTION

In order to address the concerns raised hereinabove, a method and apparatus are provided to identify a fault in an off-going clutch during a shift event, as applied in a transmission device of an exemplary powertrain.

In accordance with an embodiment of the present invention, there is provided a method, and an article of manufacture operable to execute the method, to control operation of an electrically variable transmission device selectively operative in either of a fixed gear mode and a continuously variable mode, during execution of a shift. The method includes deactivating an off-going torque-transfer clutch, monitoring slippage of the oft-going torque-transfer clutch, and limiting a change in operation of an electrical machine operatively connected to the electrically variable transmission device until the slippage of the off-going torque-transfer clutch exceeds a threshold. Limiting a change in operation of the electrical machine comprises limiting an output torque of the electrical machine, comprising limiting a time-rate change in the output torque and limiting a magnitude of the output torque. The limit of the change in operation of the electrical machine is discontinued when the slippage of the off-going torque-transfer clutch exceeds the threshold.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF AN EMBODIMENT OF THE INVENTION

Figure 1:
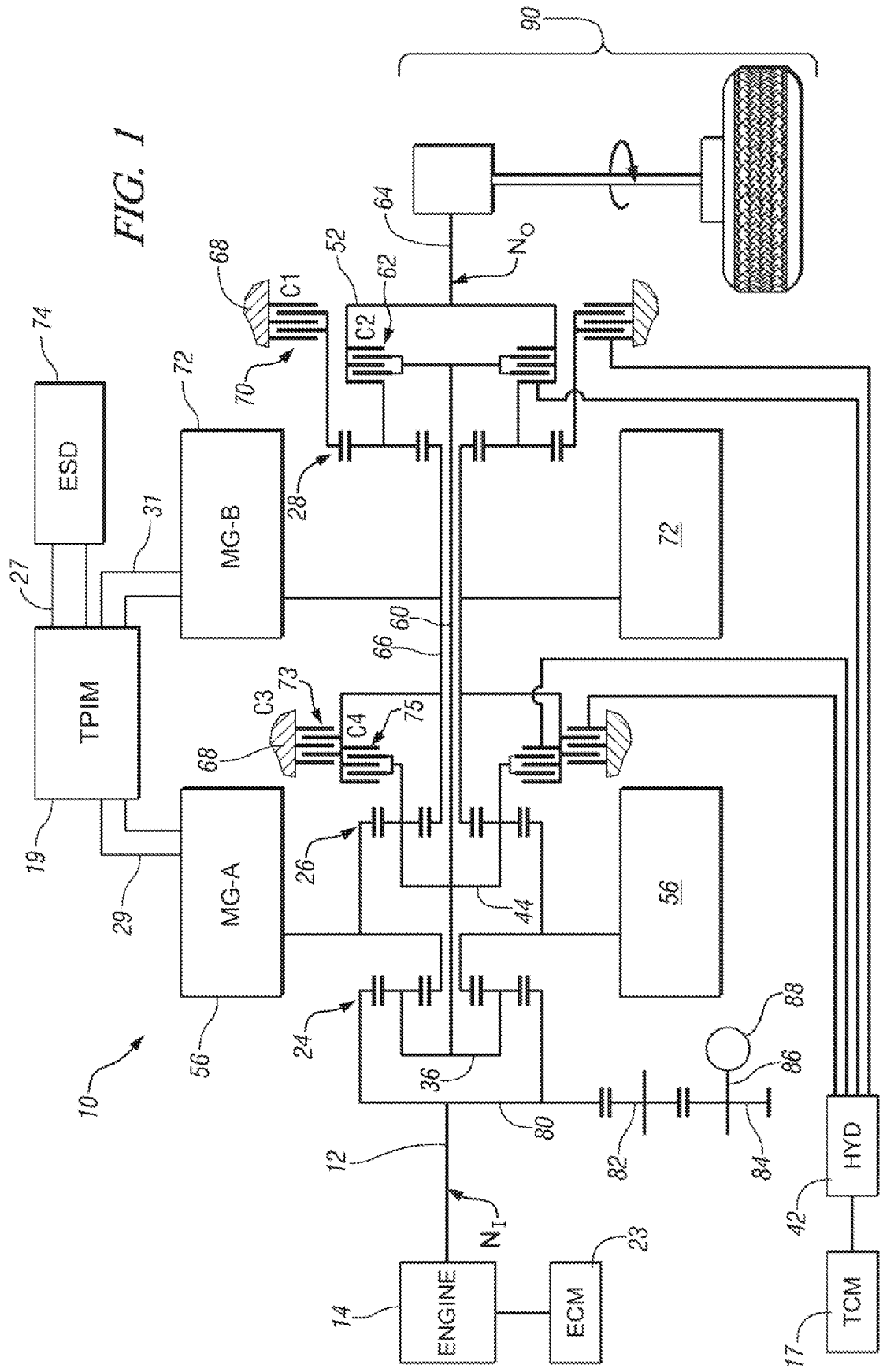
FIG. 1 is a schematic diagram of an exemplary powertrain, in accordance with the present, invention.
Figure 2:
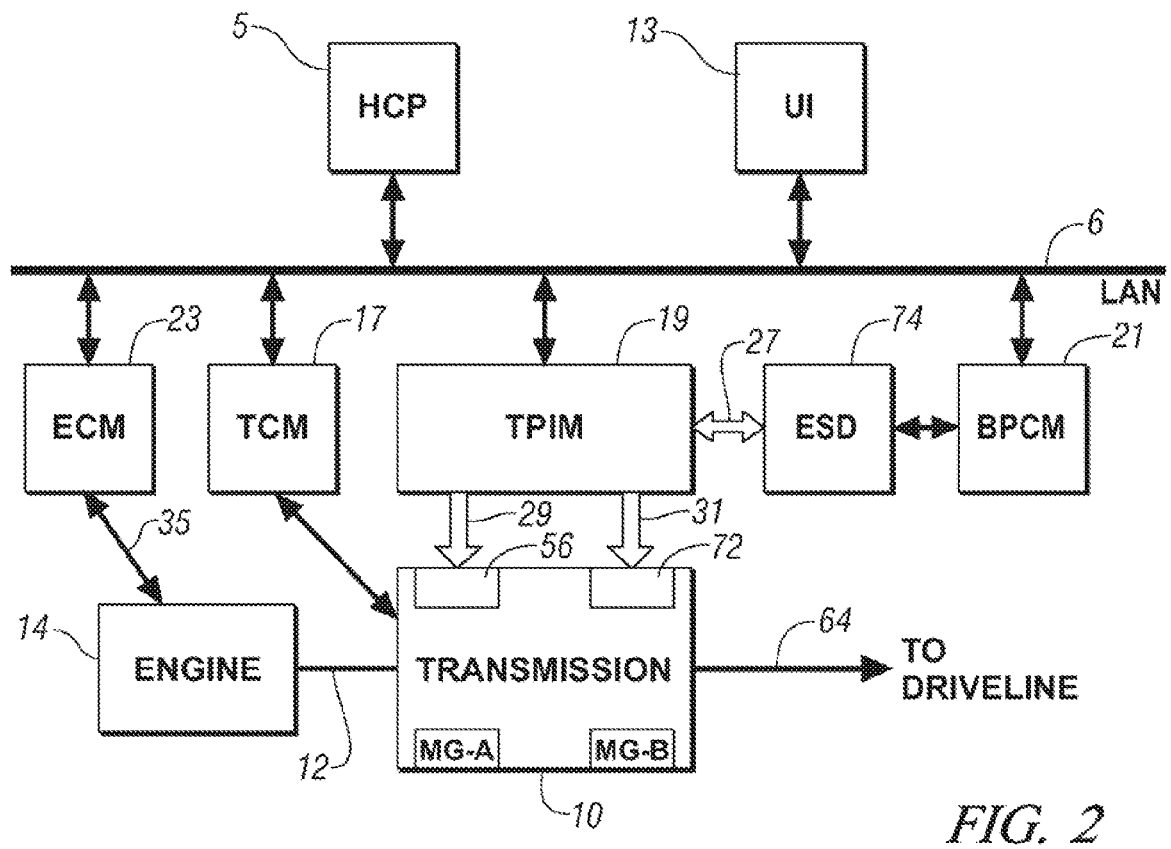
FIG. 2 is a schematic diagram of an exemplary architecture for a control system and powertrain, in accordance with the present invention.

Referring now to the drawings, wherein the depictions are for the purpose of illustrating the invention only and not for the purpose of limiting the same. FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1, and is designated generally by the numeral 10. The transmission 10 has an input shaft 12 that is preferably directly driven by an internal combustion engine 14. The transmission 10 utilizes three planetary-gear sets 24, 26 and 28, and four torque-transmitting devices, i.e., clutches C1 70, C2 62, C3 73, and C4 75. An electro-hydraulic control system 42, preferably controlled by transmission control module 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68.

The three planetary gear sets 24, 26 and 28 each comprise simple planetary gear sets. Furthermore, the first and second planetary gear sets 24 and 26 are compounded in that the inner gear member of the first planetary gear set 24 is conjoined to an outer gear member of the second planetary gear set 26, and connected to a first electrical machine comprising a motor/generator 56, also referred to as "MG-A".

The planetary gear sets 24 and 26 are further compounded in that carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through clutch C2 62. The carrier 52 of the third planetary gear set 28 is connected directly to the transmission output member 64. An inner gear member of the second planetary gear set 26 is connected to an inner gear member of the third planetary gear set 28 through a sleeve shaft 66 that circumscribes shaft 60, and is connected to a second electrical machine comprising a motor/generator 72, referred to as MG-B.

Figure 4:
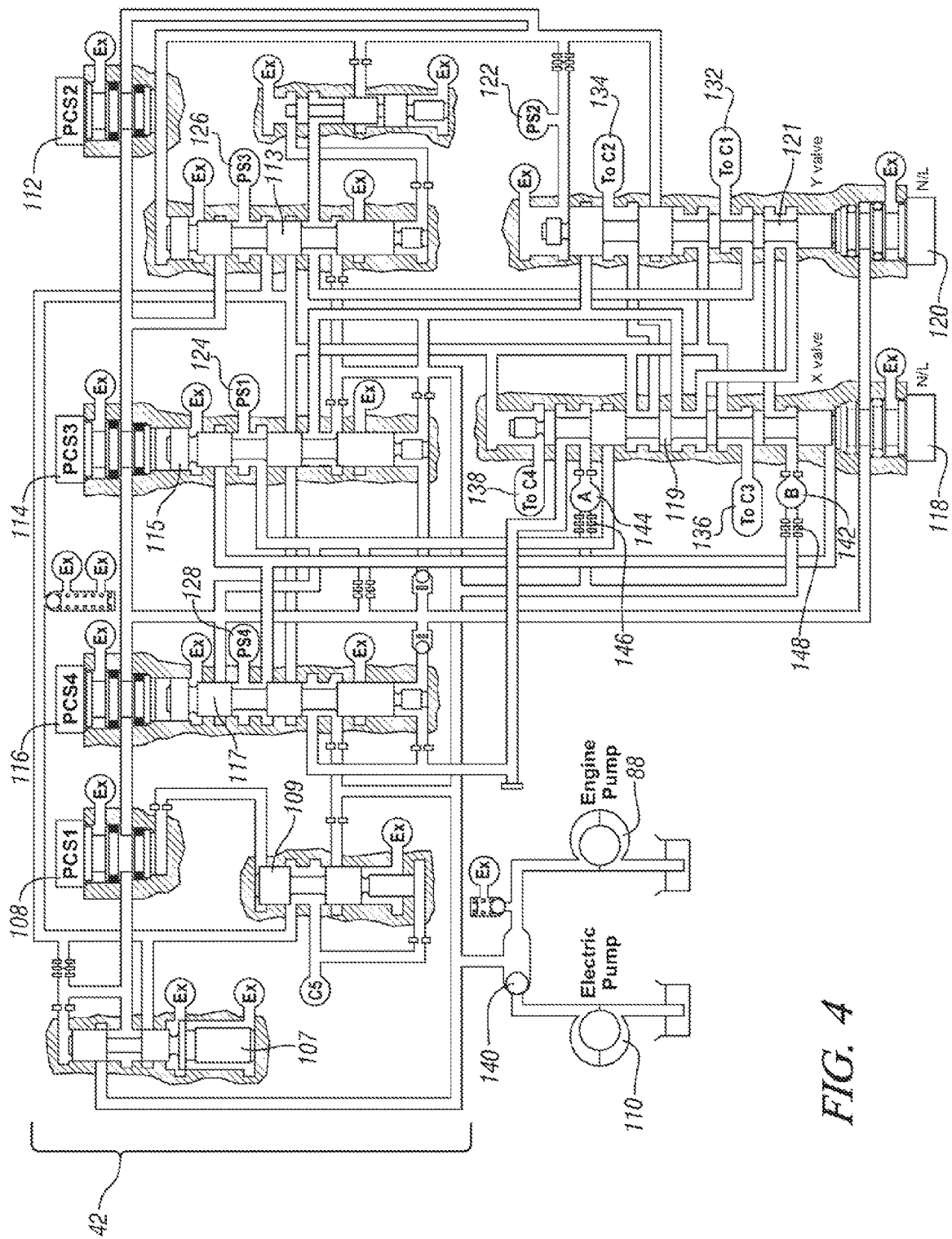
FIG. 4 is a schematic diagram of a hydraulic circuit, in accordance with the present invention; and, FIG. 5 is a logic flowchart, in accordance with the present, invention.

All the planetary gear sets 24, 26 and 28 as well as MG-A and MG-B 56 and 72 are preferably coaxially oriented, as about the axially disposed shaft 60. MG-A and MG-B 56 and 72 are both of an annular configuration which permits them to circumscribe the three planetary gear sets 24, 26 and 28 such that the planetary gear sets 24, 26 and 28 are disposed radially inwardly of the MG-A and MG-B 56 and 72. Transmission output member 64 is operably connected to a vehicle driveline 90 to provide motive torque. Each clutch is preferably hydraulically actuated, receiving pressurized hydraulic fluid from a pump, described below, via an electro-hydraulic control circuit 42 described hereinbelow with reference to FIG. 4.

The transmission 10 receives input motive torque from the torque-generative devices, including the engine 14 and the MG-A 56 and MG-B 72, as a result of energy conversion from fuel or electrical potential stored in an electrical energy storage device (ESD) 74. The ESD 74 typically comprises one or more electrochemical energy storage batteries. Other electrical energy and electrochemical energy storage devices that have the ability to store electric power and dispense electric power may be used in place of the batteries without altering the concepts of the present, invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module ('TPIM') 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control, modules configured to receive motor control commands and control inverter states therefrom for providing motor drive or regeneration functionality.

In motoring control, the respective inverter receives current from the DC transmission lines and provides AC current to the respective electrical machine, i.e., MG-A and MG-B, over transfer conductors 29 and 31. In regeneration control, the respective inverter receives AC current from the electrical machine over transfer conductors 29 and 31 and transmits current to the DC lines 27. The net DC current provided to or from the inverters determines the charge or discharge operating mode of the electrical energy storage device 74. Preferably, MG-A 56 and MG-B 72 are three-phase AC machines each having a rotor operable to rotate within a stator that is mounted on a case of the transmission. The inverters comprise known complementary three-phase power electronics devices.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the electrical machines 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump 88. Hydraulic pump 88 is a known device preferably sized to supply hydraulic fluid to the hydraulic circuit of the transmission at pressure/flow rates sufficient to meet system requirements, including pressure levels for clutch actuation, and flow rates sufficient to meet needs for system cooling and lubrication. Further details of the exemplary hydraulic circuit are depicted with reference to FIG. 4, described hereinbelow.

Referring now to FIG. 2, a schematic block; diagram of the control system, comprising a distributed control module architecture, is depicted. The elements described hereinafter comprise a subset of an overall vehicle control architecture, and are operable to provide coordinated system control of tire powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain through a request for torque, $T_O$, including the transmission 10. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque $T_O$, an engine torque command, clutch torque commands for the various clutches C1, C2, C3, C4 of the transmission 10; and motor torque commands for MG-A and MG-B. The TCM is operatively connected to the electro-hydraulic control circuit 42 of FIG. 4, including monitoring various pressure sensing devices, depicted generally as sensing device 78, and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively depicted as aggregate line 35. The ECM 23 receives the engine torque command from the HCP 5, and generates a desired axle torque, and an indication of actual input torque, $T_I$ from the engine to the transmission, which is communicated to the HCP 5. For simplicity, ECM 23 is depicted generally having bi-directional interface with engine 14 via aggregate line 35. Various other parameters that may be sensed by ECM 23 include engine coolant temperature, input speed, $N_I$, from the engine to shaft 12 leading to the transmission, manifold pressure, ambient, air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes batten state-of-charge, battery voltage and available battery power.

The TPIM 19 includes previously referenced power inverters and motor control modules configured to receive motor control commands and control inverter states therefrom to provide motor drive or regeneration functionality. The TPIM 19 is operable to generate torque commands for MG-A 56 and MG-B 72, based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read-only-memory (ROM), random access memory (RAM), electrically programmable read-only-memory (EPROM), high speed clock, analog to digital (A/D) and digital to analog (D/A) conversion circuitry, and input/output circuitry and devices (I/O) and appropriate signal conditioning and buffer circuitry. Each control module has a set of control algorithms, comprising machine-readable code consisting of resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine requested output torque, $T_O$ at shaft 64, also referred to as an operator torque request. Selectively operated components of the transmission 10 are appropriately controlled and manipulated to respond to the operator demand. For example, in the exemplary embodiment depicted in FIGS. 1 and 2, when the operator has selected a forward drive range and manipulates either the accelerator pedal or the brake pedal, the HCP 5 determines output torque, $T_O$, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical transmission, includes output member 64 which receives output torque through two distinct gear trains within the transmission 10, and operates in several transmission operating modes, described with reference now to FIG. 1, and Table 1, below.

TABLE 1

| Transmission Operating Mode | Actuated Clutches | |
|---|---|---|
| Mode I | C1 70 | |
| Fixed Ratio 1 (GR1) | C1 70 | C4 75 |
| Fixed Ratio 2 (GR2) | C1 70 | C2 62 |
| Mode II | C2 62 | |
| Fixed Ratio 3 (GR3) | C2 62 | C4 75 |
| Fixed Ratio 4 (GR4) | C2 62 | C3 73 |

The various transmission operating modes described in the table indicate which of the specific, clutches C1, C2, C3, and C4 are engaged or actuated for each of the operating modes. Additionally, in various transmission operating modes, MG-A and MG-B may each operate as electrical motors to generate motive torque, or as a generator to generate electrical energy.

The control system, depicted primarily in FIG. 2, is operable to provide a range of transmission output speeds, $N_O$, of shaft 64 from relatively slow to relatively fast within each mode of operation. The combination of two continuously variable modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e., either clutch C1 62 or C2 70, and by the controlled speed and torque of the electrical machines 56 and 72, referred to as a continuously variable transmission mode. Certain ranges of operation are described below in which fixed ratios are achieved by applying an additional clutch. This additional clutch may be clutch C3 73 or C4 75, as depicted in Table 1, above.

When the additional clutch is applied, fixed ratio operation of input-to-output speed of the transmission, i.e., $N_I/N_O$, is achieved. The rotations of machines MG-A and MG-B 56, 72 are dependent on internal rotation of the mechanism as defined by the clutching and proportional to the input speed, $N_I$, determined or measured at shaft 12. The machines MG-A and MG-B function as motors or generators. They are completely independent of engine to output power flow, thereby enabling both to be motors, both to function as generators, or any combination thereof. This allows, for instance, during operation in Fixed Ratio 1 that, motive power output from the transmission at shaft 64 is provided by power from the engine and power from MG-A and MG-B, through planetary gear set 28 by accepting power from the energy storage device 74.

Figure 3:
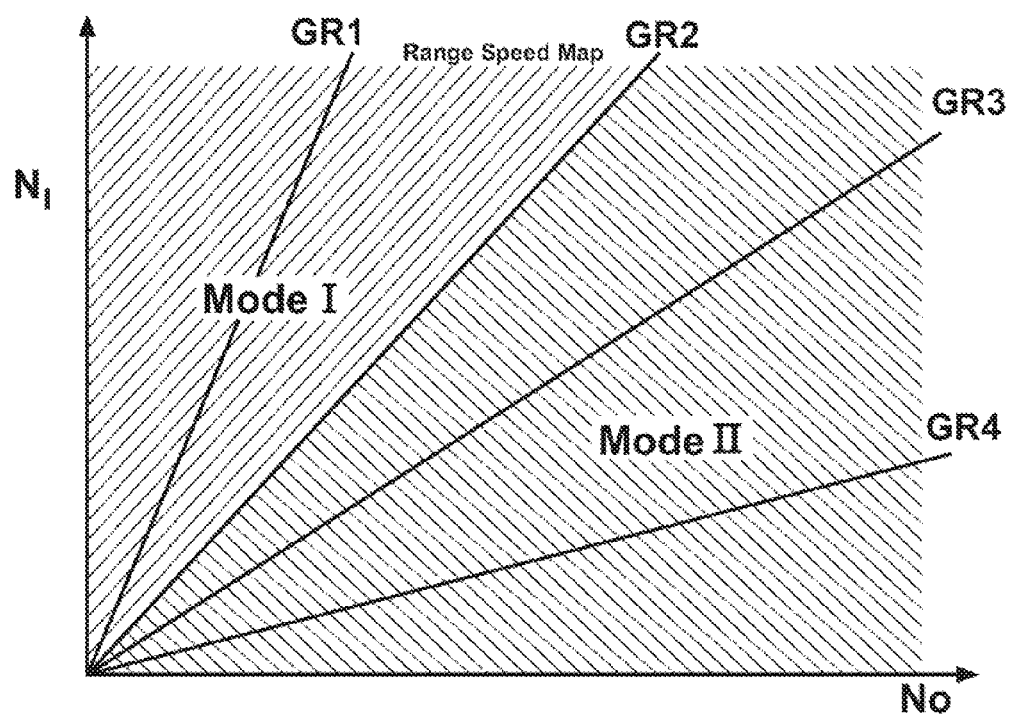
FIG. 3 is a graphical depiction, in accordance with the present invention.

Referring now to FIG. 3, various transmission operating modes are plotted as a function of transmission output speed, $N_O$, and transmission input speed, $N_I$, for the exemplary transmission and control system depicted in FIGS. 1 and 2. The Fixed Ratio operating operation is depicted as individual lines for each of the specific gear ratios, GR1, GR2, GR3, and GR4, as described with reference to Table 1, above. The continuously variable Mode operation is depicted as ranges of operation for each of Mode I and Mode II. The transmission operating mode is switched between Fixed Ratio operation and continuously variable Mode operation by activating or deactivating specific clutches. The control system is operative to determine a specific transmission operating mode based upon various criteria, using algorithms and calibrations executed by the control system, and is outside the scope of this invention.

Selection of the transmission operating mode depends primarily on operator input and the ability of the powertrain to meet that input. The first fixed gear ratio, GR1, is available during continuously variable mode I, when clutches C1 and C4 are engaged. The second fixed gear ratio, GR2, is available during mode I, when clutches C1 and C2 are engaged. The third fixed ratio range, GR3, is available during continuously variable mode I, and during continuously variable mode II when clutches C2 62 and C4 75 are engaged, and the fourth fixed ratio range, GR4, is available during mode II when clutches C2 62 and C3 73 are engaged, it should be recognized that ranges of continuously variable operation for Mode I and Mode II may overlap.

Output of the exemplary powertrain system described hereinabove is constrained due to mechanical and system limitations. The output speed, $N_o$, of the transmission measured at shaft 64 is limited due to limitations of engine output speed measured at shaft 18, and transmission input speed, $N_I$, measured at shaft 12, and speed limitations of machines MG-A and MG-B. Output torque, $T_O$, of the transmission 64 is similarly limited due to limitations of the input torque, $T_I$, measured at shaft 12 after a transient torque damper and torque limitations of MG-A and MG-B 56, 72.

Referring again to FIG. 4, a schematic diagram is depicted which provides a more detailed description of the exemplary electro-hydraulic system for controlling flow of hydraulic fluid in the exemplary transmission. As previously described with reference to FIG. 1, the main hydraulic pump 88 is driven by gears 82 and 84 that are operatively driven off the input shaft from the engine 10. The main hydraulic pump 88 receives input torque from the engine and pumps hydraulic fluid drawn from a sump into a hydraulic circuit of the transmission, initially passing through control valve 140. The auxiliary pump 110 is operatively controlled by an auxiliary operating pump control module ('TAOP') (not shown), which is operatively controlled by the TPIM 19. The auxiliary pump 110 preferably comprises an electrically-powered pump of an appropriate size and capacity to provide sufficient flow of pressurized hydraulic fluid into the hydraulic system when operational. The TPIM preferably generates a pulse-width-modulated signal of fixed frequency and a duty cycle which varies from a low value to high value to drive the pump 110, the duty cycle depending upon the desired output from the pump. The pump 110 receives the signal and pumps hydraulic fluid drawn from the sump into the hydraulic circuit which flows to fluid control valve 140.

Pressurized hydraulic fluid flows into electro-hydraulic control circuit 42, which is operable to selectively distribute hydraulic pressure to a series of devices, including the torque-transfer clutches C1 70, C2 62, C3 73, and C4 75, active cooling circuits for machines MG-A and MG-B, and a base cooling circuit for cooling and lubricating the transmission 10 via passages 142, 144 (not depicted in detail). As previously stated, the TCM 17 is preferably operable to actuate the various clutches to achieve various transmission operating modes through selective actuation of hydraulic circuit flow control devices comprising pressure control solenoids ('PCS') PCS1 108, PCS2 112, PCS3 114, PCS4 116 and solenoid-controlled flow management valves X-valve 118 and Y-valve 120. The circuit is fluidly connected to pressure switches PS1, PS2, PS3, and PS4 via passages 124, 122, 126, and 128, respectively. The pressure control solenoid PCS1 108 has a control position of normally high and is operative to provide modulation of fluidic pressure in the hydraulic circuit through fluidic interaction with pressure regulator 109. Pressure control solenoid PCS2 112 has a control position of normally low, and is fluidly connected to spool valve 113 and operative to effect flow therethrough when actuated. Spool, valve 113 is fluidly connected to pressure switch PS3 via passage 126. Pressure control solenoid PCS3 114 has a control position of normally low, and is fluidly connected to spool, valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 comprise flow management valves controlled by shift solenoids 118, 120, respectively, in the exemplary system, and have control states of High ('1') and Low ('0'). The control states reference positions of each valve effecting flow control to different, devices in the hydraulic circuit 42 and the transmission 10. The X-valve 119 is operative to direct pressurized fluid to clutches C3 and C4 and cooling systems for stators of MG-A and MG-B via fluidic passages 136, 138, 144, 142 respectively, depending upon the source of the fluidic input, as is described hereinafter. The Y-valve 121 is operative to direct pressurized fluid to clutches C1 and C2 via fluidic passages 132 and 134 respectively, depending upon the source of the fluidic input, as is described hereinafter. The Y-valve 121 is fluidly connected to pressure switch PS2 via passage 122. Selective control of the X- and Y-valves and actuation of the solenoids PCS2, PCS3, and PCS4 facilitate flow of hydraulic fluid to actuate clutches C1, C2, C3, and C4, and provide cooling for the stators of MG-A and MG-B.

The TCM 17 is preferably operable to actuate various clutches to achieve various transmission operating states through selective actuation of the pressure control solenoids and shift solenoids. An exemplary logic table to accomplish such control using the electro-hydraulic control circuit 42 is provided with reference to Table 2, below.

TABLE 2

| Operating Mode | X-Valve Logic No Latch | Y-Valve Logic C2 Latch | PCS1 Normal High | PCS2 Normal High | PCS3 Normal High | PCS4 Normal Low |
|---|---|---|---|---|---|---|
| Mode I | 0 | 0 | Line Modulation | MG-B Stator Cooling | C1 | MG-A Stator Cooling |
| Mode II | 0 | 1 | Line Modulation | C2 | MG-B Stator Cooling | MG-A Stator Cooling |
| GR1, GR2, GR3 | 1 | 0 | Line Modulation | C2 | C1 | C4 |
| GR3, GR4 | 1 | 1 | Line Modulation | C2 | C3 | C4 |

Selective control of the X and Y valves and actuation of the solenoids PCS1 to PCS4 facilitate flow of hydraulic fluid to actuate clutches C1, C2, C3, and C4, and provide cooling for the stators of MG-A and MG-B ("MG-A Stator Cooling", "MG-B Stator Cooling"). Thus, by way of example with reference to Table 1 and Table 2, the exemplary transmission can be operated in fixed gear GR4 through actuation of clutches C2 and C3, which is accomplished through controlling the X-Y flow switching valves in control states of High ('1') and operating PCS2 and PCS3 in 'High' states.

In operation, a shift occurs in the exemplary transmission clue to a variety of operating characteristics of the powertrain. There may be a change in demand for an operator demand for torque. Such demands are typically communicated through inputs to the UI 13 as previously described. Additionally, a change in demand for output torque may be predicated on a change in external conditions, including, e.g., changes in road grade, road surface conditions, or wind load. A shift change may be predicated on a change in powertrain torque demand caused by a control module command to change one of the electrical machines between electrical energy generating mode and torque generating mode. A shift, change may be predicated on a change in an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and there can be changes in system optimization that compel a shift change in order to optimize system efficiencies to improve fuel economy and manage battery charging. Furthermore, a shift change may be predicated upon a fault in a component or system. The distributed control module architecture acts in concert to determine a need for a change in the transmission operating mode, and executes the forgoing to effect the change. A shift change in the exemplary system comprises one of at least four possible situations. There can be a shift from one fixed gear to a second fixed gear. There can be a shift, from a fixed gear to one of the continuously variable modes. There can be a shift from one of the continuously variable modes to a fixed gear. There can be a shift from one of the continuously variable modes to the other continuously variable mode.

Figure 5:
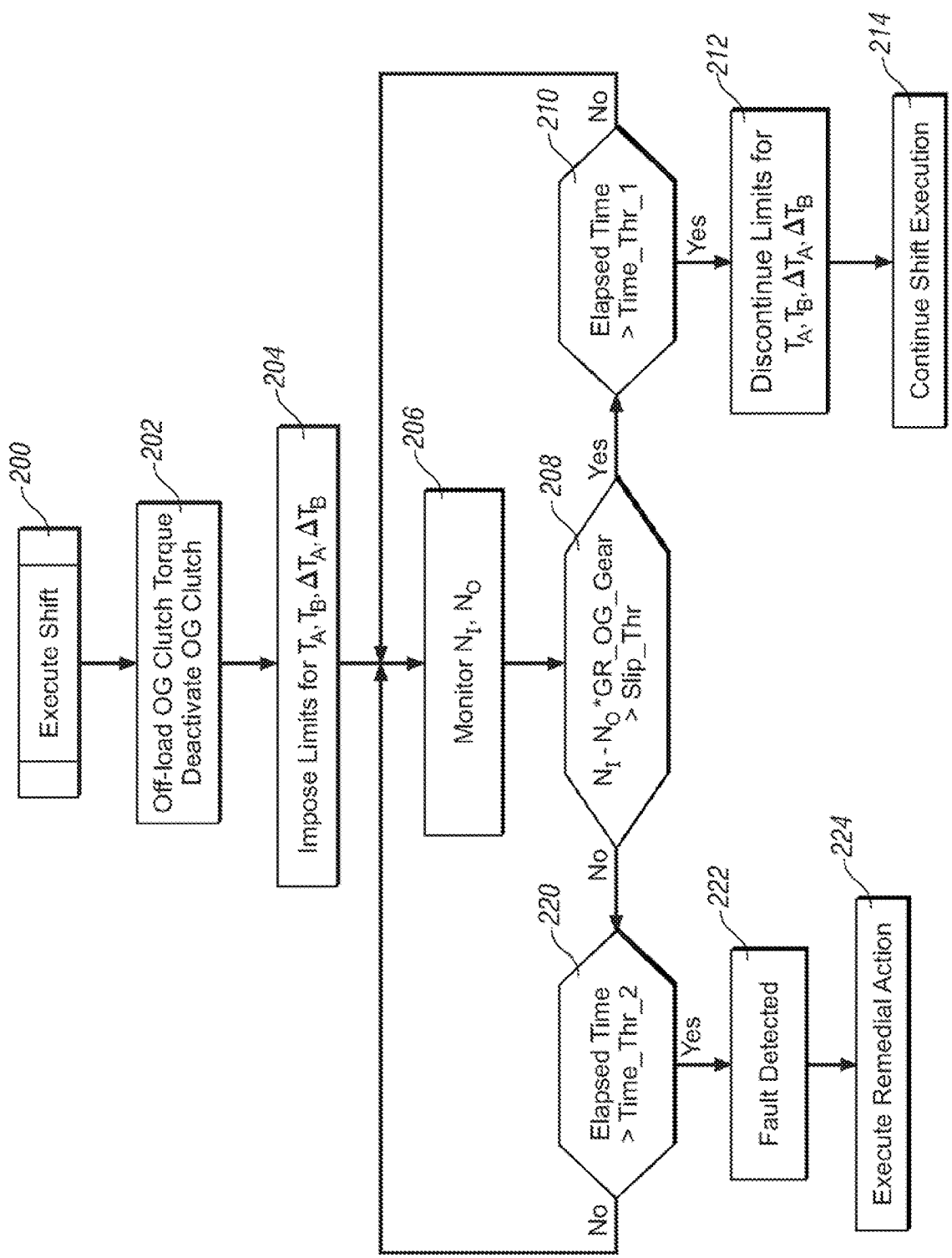

Referring now to FIG. 5, a logic flow chart provides a description of operation of the invention, executed in the exemplary system described with reference to FIGS. 1-4. The invention generally comprises an algorithm resident in one of the control modules and executed therein, which acts to implement a method to effect a shift from a first operating mode to a second operating mode, based upon criteria previously described. As an introduction, when a shift is executed from one fixed gear to a second fixed gear, the shift process includes deactivating an off-going ('OG') clutch, and actuating an oncoming clutch. By way of example, in shifting from GR1 to GR2, off-going clutch C4 75 is deactivated, and oncoming clutch C2 62 is actuated, permitting it to transmit torque. Clutch C1 70 remains actuated throughout the shift process. Actuating the oncoming clutch preferably includes synchronizing the speeds of the elements of the oncoming clutch by controlling operation of the torque-generative devices and, if necessary, controlling slippage of the oncoming clutch. A shift change out of any of the fixed gear operating modes preferably comprises a process wherein torque transmitted across the off-going clutch is offloaded prior to its deactivation. Offloading torque across the off-going clutch includes adjusting torque-carrying capacity across other torque-transmission paths, e.g., using MG-A, MG-B, and the oncoming clutch. Deactivating an off-going clutch preferably comprises decreasing the torque-carrying capacity of the off-going clutch by reducing hydraulic pressure through control of one of the solenoids, as previously described.

Referring again to FIG. 5, a command to execute a shift out a fixed gear is issued (Block 200). Torque is off-loaded from the off-going ('OG') clutch. The OG clutch is deactivated (Block 202) by selectively controlling elements in the electro-hydraulic control circuit 42, including reducing flow of pressurized hydraulic fluid to the OG clutch. The control system imposes limits on change in torque outputs ($\Delta T_A$, $\Delta T_B$) and absolute torque outputs ($T_A$, $T_B$) from the electric machines MG-A and MG-B (Block 204). Input speed, $N_I$, and output speed, $N_O$ are monitored, preferably using known sensing devices (Block 206).

Clutch slip is characterized in terms of speed and elapsed time, wherein the parametric value for input speed, $N_I$, is compared to the parametric value for the output speed, $N_O$ multiplied by the gear ratio of the off-going gear ('GR_OG_Gear'), represented as $N_I-[N_O*GR\_OG\_Gear]$. Clutch slip is monitored (Block 208), and compared to a threshold difference, Slip_Thr. When the clutch slip exceeds the threshold difference, Slip_Thr, and does so for an elapsed time greater than a first threshold time ('Time_Thr_1') (Block 210), the imposed limits on change in torque output and absolute torque output from the electric machines MG-A and MG-B are discontinued (Block 212), and shift execution continues (Block 214). When clutch slip does not exceed the slip threshold, Slip_Thr, and does not exceed the slip threshold for an elapsed time greater than a second threshold time ('Time_Thr_2') (Block 220), a fault is detected (Block 222), and the control system undertakes remedial action (Block 224).

The control system-imposed limits on the change in torque outputs ($\Delta T_A$, $\Delta T_B$) and absolute torque outputs ($T_A$, $T_B$) from the electric machines MG-A and MG-B (depicted in Block 204) preferably comprise torque values dynamically determined in the control system based upon the operating conditions of the powertrain at the time of the shift execution. The intent in programming the control system to dynamically determine imposed limits is to have limits which minimize effect on torque output to the driveline, including occurrence of jerks and other unanticipated changes in vehicle torque. The elapsed time threshold, Time_Thr_2, is calibrated at a magnitude which minimizes risk of unintended torque, and is preferably in the range of 50 milliseconds for the exemplary embodiment.

When, during shift execution, the clutch slip of the OG clutch does not exceed the slip threshold after the elapsed time period, the control system executes remedial actions (Block 224). The remedial actions preferably include actions comprising controlling clutch actuation and managing torque outputs of the engine 14 and the electrical machines MG-A and MG-B, 56, 72. The intent of the control scheme is to continue to meet the operator demand for torque while preventing harm to the powertrain hardware. The remedial action can comprise executing a revised shift operation, e.g., into a third operating mode, to substantially meet the operator request for output torque. The third operating mode comprises, for example, shifting into a permissible transmission operating mode and adjusting torque inputs from the engine and the electrical machines. Other remedial actions can include informing the operator of the presence of a fault through illuminating a lamp on the vehicle dashboard, and executing some form of 'limp-home' operation, each which is outside the scope of the invention.

The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for controlling an electro-mechanical transmission during a shift execution, comprising:
   deactivating an off-going torque-transfer clutch;
   monitoring slippage of the off going torque-transfer clutch; and,
   limiting a change in operation of an electrical machine operative to transmit torque to the electro-mechanical transmission until the slippage of the off-going torque-transfer clutch exceeds a threshold.

2. The method of claim 1, wherein limiting the change in operation of the electrical machine comprises limiting a change in output torque of the electrical machine.

3. The method of claim 2, wherein limiting the change in output torque of the electrical machine further comprises limiting a time-rate change in the output torque and limiting a magnitude of the output torque.

4. The method of claim 1, further comprising discontinuing the limiting of change in operation of the electrical machine when the slippage of the off-going torque-transfer clutch exceeds the threshold.

5. The method of claim 4, wherein the threshold comprises a magnitude of the slippage of the off-going clutch and an elapsed period of time.

6. The method of claim 1, further comprising identifying presence of a fault, and, executing a remedial transmission operation when the slippage of the off-going torque-transfer clutch does not exceed the threshold after an elapsed period of time.

7. The method of claim 6, wherein executing remedial transmission operation comprises executing a revised shift operation into a third operating mode effective to substantially meet an operator request for output torque.

8. The method of claim 1, wherein the electro-mechanical transmission is selectively operative to transmit torque between an internal combustion engine, first and second electrical machines and an output shaft, and further comprising:
   limiting a change in torque outputs from the first and second electrical machines to the electro-mechanical transmission until the slippage of the off-going torque-transfer clutch exceeds the threshold.

9. Method for controlling a powertrain system during clutch deactivation, comprising:
   commanding deactivation of an off-going torque-transfer clutch;
   determining slippage within an electro-mechanical transmission, comprising a difference between a transmission input speed and a second speed comprising a transmission output speed factored by a gear ratio;
   limiting changes in torque inputs from first and second electrical machines to the electro-mechanical transmission when the slippage does not exceed a threshold; and,
   identifying a fault when the slippage fails to exceed the threshold after an elapsed period of time.

10. The method of claim 9, further comprising executing remedial control of the powertrain system when a fault is identified.

11. Article of manufacture, comprising a storage medium having a computer program encoded therein for effecting a method to control operation of an electro-mechanical transmission during execution of a shift, the program comprising:
   code to deactivate an off-going torque-transfer clutch;
   code to monitor slippage of the off-going torque-transfer clutch; and,
   code to limit a magnitude of and a time-rate change in torque output from an electrical machine to the electro-mechanical transmission until the slippage of the off-going torque-transfer clutch exceeds a threshold.

12. The article of manufacture of claim 11, further comprising code to discontinue the limit of the magnitude of and the time-rate change in the torque output from the electrical machine when the slippage of the off-going torque-transfer clutch exceeds the threshold.

13. The article of manufacture of claim 12, wherein the threshold comprises a magnitude of the slippage of the off-going clutch and an elapsed period of time.

14. The article of manufacture of claim 11, further comprising code to identify presence of a fault, and, execute a remedial transmission operation when the slippage of the off-going torque-transfer clutch does not exceed the threshold after an elapsed period of time.

15. Powertrain system, comprising:
   an internal combustion engine and first and second electrical machines and an electro-mechanical transmission selectively operative to transmit torque therebetween the transmission selectively operative in one of a plurality of operating modes through selective actuation of a plurality of torque-transfer clutches;
   a control system: adapted to control the internal combustion engine, the electrical machines, and the transmission;
   the control system adapted to execute machine-readable code comprising a method to control operation of the transmission during a shift execution, the code comprising:
   i) code to deactivate an off-going torque-transfer clutch;
   ii) code to monitor slippage of the off-going torque-transfer clutch; and, iii) code to limit a change in output of each of the electrical machines until the slippage of the off-going torque-transfer clutch exceeds a threshold.

16. The powertrain system of claim 15, wherein the electrical machines each comprise motor/generator devices.

17. The powertrain system of claim 16, wherein code to limit a change in output of each of the electrical machines comprises code to limit torque transmitted between each of the electrical machines and the transmission.

18. The powertrain system of claim 17, wherein the code to limit torque transmitted between each of the electrical machines and the transmission comprises code to limit a change in the transmitted torque and limit a magnitude of the transmitted torque.

19. The powertrain system of claim 17, wherein code to monitor slippage of the off-going torque-transfer clutch comprises: code to compare an input speed from the internal combustion engine with a speed of an output shaft of the transmission multiplied by a gear ratio of a gear associated with the off-going clutch.

20. The powertrain system of claim 17, wherein the electro-mechanical transmission comprises a two-mode, compound-split torque transmission device selectively operative in one of the plurality of operating modes comprising fixed gear modes and two continuously variable modes.

* * * * *